United States Patent [19]
Spratte

[11] Patent Number: 5,764,766
[45] Date of Patent: Jun. 9, 1998

[54] SYSTEM AND METHOD FOR GENERATION OF ONE-TIME ENCRYPTION KEYS FOR DATA COMMUNICATIONS AND A COMPUTER PROGRAM PRODUCT FOR IMPLEMENTING THE SAME

[75] Inventor: Michael Spratte, Colorado Springs, Colo.

[73] Assignee: Digital Equipment Corporation, Maynard, Mass.

[21] Appl. No.: 661,425

[22] Filed: Jun. 11, 1996

[51] Int. Cl.⁶ .................................................. H04K 1/00
[52] U.S. Cl. .................................. 380/21; 380/28; 380/45
[58] Field of Search .................................. 380/21, 28, 44, 380/45

[56] References Cited

U.S. PATENT DOCUMENTS

| | | | |
|---|---|---|---|
| 4,200,770 | 4/1980 | Hellman et al. | 178/22 |
| 4,218,582 | 8/1980 | Hellman et al. | 178/22 |
| 4,965,804 | 10/1990 | Trbovich et al. | 380/21 |
| 5,048,087 | 9/1991 | Trbovich et al. | 380/43 |
| 5,555,309 | 9/1996 | Kruys | 380/21 |

*Primary Examiner*—David C. Cain
*Attorney, Agent, or Firm*—William J. Kubida; Michael A. Rodriguez

[57] ABSTRACT

A system and method and computer program product for encrypting data communications comprising the generation of a salt at a data transmitting system and combination of the salt with a primary encryption key known at the data transmitting system and a data receiving system. The salt and the primary encryption key are hashed to produce a transmitting encryption key and a data message is encrypted with an encryption function utilizing the transmitting encryption key to produce a ciphertext message. The salt and the ciphertext message are transmitted to the data receiving system where the salt and the primary encryption key are hashed to produce a receiving decryption key and the data message is retrieved by performing a symmetrical decryption function on the ciphertext message and the receiving decryption key.

20 Claims, 2 Drawing Sheets

SYSTEM AND METHOD FOR GENERATION OF ONE-TIME ENCRYPTION KEYS FOR DATA COMMUNICATIONS AND A COMPUTER PROGRAM PRODUCT FOR IMPLEMENTING THE SAME

BACKGROUND OF THE INVENTION

The present invention relates, in general, to the field of systems and methods for encrypting data communications. More particularly, the present invention relates to a system and method for generation of one-time encryption keys for data communications using a one-way cryptographic hash and a plain-text salt.

Current United States International Traffic in Arms Regulations ("ITAR") restrictions severely limit the encryption key size in computers and computer software products exported outside of the United States. As an example, software is generally exportable only in conjunction with a 40-bit key using the Rivest Cipher-2 ("RC2") or RC4 cipher developed by RSA Data Security, Inc. See, for example, Schneier, B.; *Applied Cryptography 2nd Ed.: Protocols, Algorithms and Source Code in C*; Wiley & Sons, 1996. A 66MHz Pentium™-based personal computer ("PC") can crack a 40-bit key in about two years on average. As a consequence, utilizing the same 40-bit key can compromise data security.

A well-known solution to this problem is to use a much larger encryption key to encrypt the session's encryption key. In this regard, the Rivest, Shamir and Adelman ("RSA") encryption algorithm is often used. However, the keys of this algorithm are quite large and can be unmanageable in high-volume commodity applications. Moreover, the RSA encryption algorithm is also known to be susceptible to timing attacks.

SUMMARY OF THE INVENTION

Particularly disclosed herein is a method for encrypting data communications which comprises the steps of generating a salt at a data transmitting system and combining the salt with a primary encryption key known at the data transmitting system and a data receiving system. The salt and the primary encryption key are then hashed to produce a transmitting encryption key and a data message is encrypted with an encryption function utilizing the transmitting encryption key to produce a ciphertext message. In a particular embodiment, the method further comprises the steps of transmitting the salt and the ciphertext message to the data receiving system where the salt and the primary encryption key are hashed to produce a receiving decryption key and the data message is retrieved by performing a decryption function on the ciphertext message and the receiving decryption key.

Also disclosed herein is a data communications system for use in encrypting data messages between a plurality of computer systems having a commonly known primary encryption key. The data communications system comprises a data transmitting computer system for generating a salt and producing a transmitting encryption key by hashing the salt with the primary encryption key. A ciphertext message is then produced by encrypting a data message with an encryption function utilizing the transmitting encryption key. The data communications system further includes a communications medium coupling the data transmitting computer system and at least one other computer system for providing the salt and the ciphertext message thereto. A data receiving computer system coupled to the communications medium hashes the salt and the primary encryption key to produce a receiving decryption key and retrieves the data message by performing a decryption function on the ciphertext message and the receiving decryption key.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
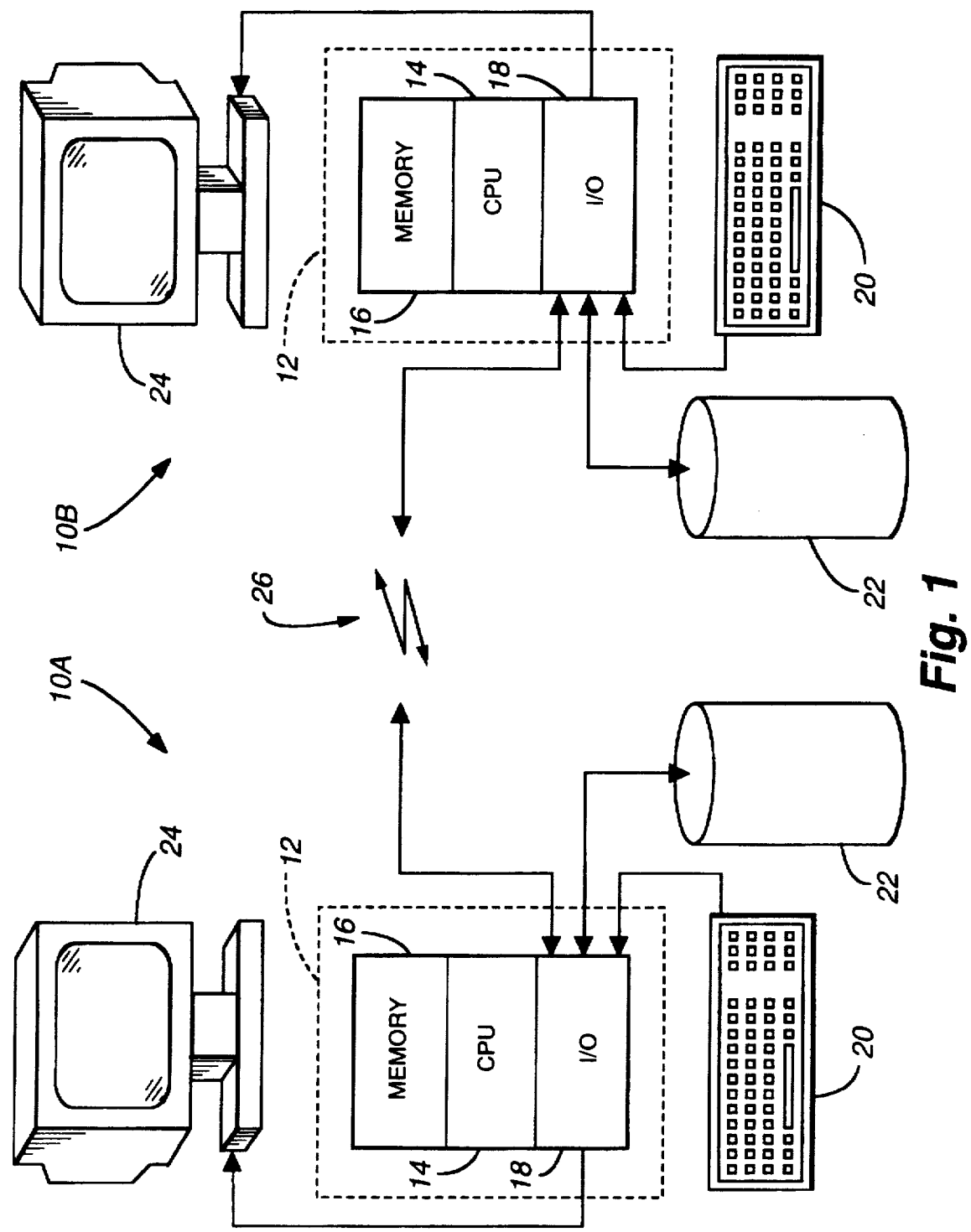
FIG. 1 is a simplified conceptual representation of a portion of a possible operating environment for implementing a system for generation and utilization of one-time encryption keys for data communications in accordance with the present invention.

With reference now to FIG. 1, a portion of a possible operating environment in which the system and method of the present invention may be utilized is shown. As illustrated, such operating environment may encompass a general distributed computing system, wherein general purpose computers, workstations or personal computers may be connected via communication links of various types, such as in a client-server arrangement, wherein programs and data, many in the form of objects, are made available by various members of the system for execution and access by other members of the system.

In this regard, some of the elements of a pair of general purpose computers 10A and 10B are shown wherein a processor 12 comprises a central processing unit ("CPU") 14, a memory section 16 and an input/output ("I/O") section 18. The I/O section 18 may be coupled to a data input device such as keyboard 20, a computer mass storage unit 22 (such as a disk drive, CDROM or other data storage device) and a display unit 24. The I/O section 18 may also have bidirectional inputs coupling the computers 10A and 10B to each other or to other computers by means of a computer network 26 such as a wide area network ("WAN"), local area network ("LAN") or other network connection such as the Internet. The computer program products disclosed herein to implement the system and method of the present invention may reside in the memory section 16, the computer mass storage unit 22 or network 26 of such a system.

Figure 2:
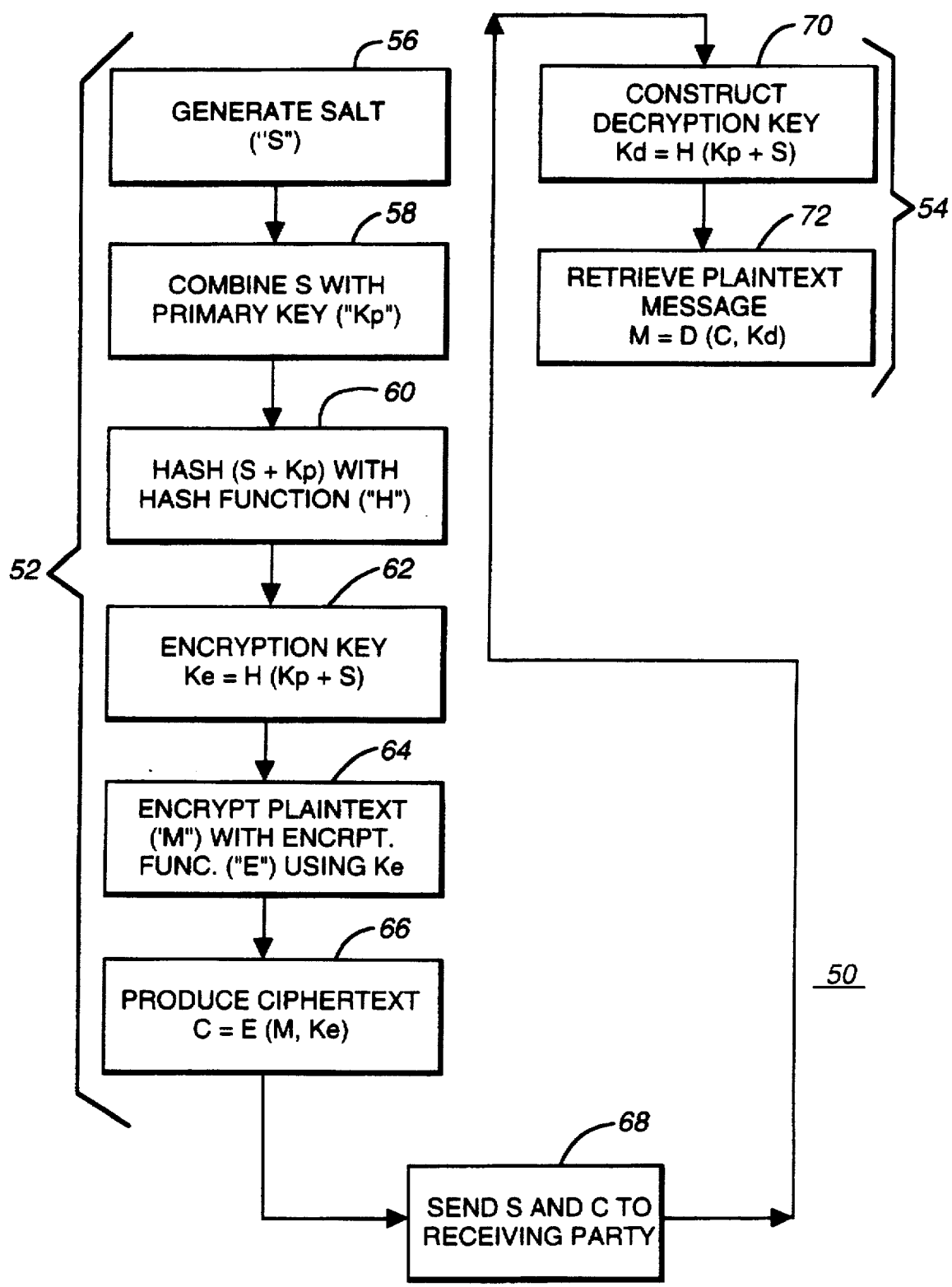
FIG. 2 is a logic flowchart illustrating a possible implementation of a method for generating one-time encryption keys in accordance with the present invention.

With reference additionally now to FIG. 2, a logic flowchart illustrating a possible implementation for a process 50 for generating one-time encryption keys in accordance with the present invention is shown. In accordance with the process 50 illustrated, it is assumed that $K_p$ is the primary secret key that two parties (each, for example, using one of computers 10A and 10B of FIG. 1 respectively) use for encryption of data communications between them. That portion of the process 50 to be implemented by a transmitting computer 10A is indicated by the numeral 52 while that portion of the process 50 to be implemented by a receiving computer 10B is indicated by the numeral 54.

If one of the parties, wants to send a message to the other, (i.e. from computer 10A to 10B) the transmitting party generates a salt ("S") at step 56 which is then combined with the primary secret key $K_p$ at step 58 and then hashed using a one-way cryptographic hash function ("H") at step 60 to create the encryption key ("$K_e$") at step 62 where:

$$K_e = H(K_p + S)$$

The hashing function may be, for example only, the Message Digest 5 ("MD5") one-way hashing function. The salt S may be conveniently derived from the computer 10A system clock or, ideally, any other number that will not occur more than once.

The transmitting party then encrypts the plaintext message ("M") with a symmetric encryption function ("E") using $K_e$ at step 64 to produce the ciphertext ("C") shown in step 66 as:

$$C = E(M, K_e)$$

The transmitting party then sends the salt S along with the ciphertext C to the receiving party via, for example the network 26, (FIG. 1) at step 68.

The receiving party then constructs $K_d$ in the same manner as the transmitting party at step 70 wherein:

$$K_d = H(K_p + S)$$

and thereafter retrieves the plaintext message utilizing a decryption function ("D") at step 72:

$$M = D(C, K_d)$$

As noted before, in a preferred embodiment, a particular salt S should be used only once even though it might be predictable. In practice, an absolute time value with sufficient resolution to guarantee uniqueness can be used. "E" and "D" are symmetric functions and may be readily modified to fit applicable export requirements.

While there have been described above the principles of the present invention in conjunction with specific methods and communications systems, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computer implemented method for encrypting data communications comprising the steps of:

generating a salt at a data transmitting system;

combining said salt with a primary encryption key known at said data transmitting system and a data receiving system;

hashing said salt and said primary encryption key to produce a transmitting encryption key; and encrypting a data message with an encryption function utilizing said transmitting encryption key to produce a ciphertext message.

2. The computer implemented method of claim 1 further comprising the step of:

transmitting said salt and said ciphertext message to said data receiving system.

3. The computer implemented method of claim 2 further comprising the steps of:

hashing said salt and said primary encryption key to produce a receiving decryption key; and retrieving said data message by performing a decryption function on said ciphertext message and said receiving decryption key.

4. The computer implemented method of claim 1 wherein said step of generating comprises the steps of:

determining a system time; and utilizing a number representing said system time as said salt.

5. The computer implemented method of claim 1 wherein said step of hashing is carried out by means of an MD5 one-way hash.

6. A data communications system for use encrypting data messages between a plurality of computer systems having a known primary encryption key, said data communications system comprising:

a data transmitting one of said plurality of computer systems for generating a salt, said data transmitting computer system further producing a transmitting encryption key by hashing said salt with said primary encryption key and a ciphertext message by encrypting a data message with an encryption function utilizing said transmitting encryption key;

a communications medium coupling said plurality of computer systems for providing said salt and said ciphertext message from said data transmitting one of said plurality of computer systems to others of said plurality of computer systems; and a data receiving one of said others of said plurality of computer systems for hashing said salt and said primary encryption key to produce a receiving decryption key and retrieving said data message by performing a decryption function on said ciphertext message and said receiving decryption key.

7. The data communications system of claim 6 wherein said salt comprises a number representing a system time of said data transmitting one of said plurality of computer systems.

8. The data communications system of claim 6 wherein said encryption and decryption functions are symmetrical.

9. The data communications system of claim 6 wherein said communications medium comprises a computer network coupling at least said data transmitting and data receiving ones of said plurality of computer systems.

10. A computer program product comprising:

a computer useable medium having computer readable code embodied therein for causing a computer to effect encryption of data communications, the computer program product comprising:

computer readable program code devices configured to cause a computer to effect generating a salt at a data transmitting system;

computer readable program code devices configured to cause a computer to effect combining said salt with a primary encryption key known at said data transmitting system and a data receiving system;

computer readable program code devices configured to cause a computer to effect hashing said salt and said primary encryption key to produce a transmitting encryption key; and computer readable program code devices configured to cause a computer to effect encrypting a data message with an encryption function utilizing said transmitting encryption key to produce a ciphertext message.

11. The computer program product of claim 10 further comprising:

computer readable program code devices configured to cause a computer to effect transmitting said salt and said ciphertext message to said data receiving system.

12. The computer program product of claim 11 further comprising:

computer readable program code devices configured to cause a computer to effect hashing said salt and said primary encryption key to produce a receiving decryption key; and computer readable program code devices configured to cause a computer to effect retrieving said data message by performing a decryption function on said ciphertext message and said receiving decryption key.

13. The computer program product of claim 10 wherein said computer readable program code devices configured to cause a computer to effect generating a salt at a data transmitting system comprise:

computer readable program code devices configured to cause a computer to effect determining a system time; and computer readable program code devices configured to cause a computer to effect utilizing a number representing said system time as said salt.

14. The computer program product of claim 10 wherein said computer readable program code devices configured to cause a computer to effect hashing of said salt and said primary encryption key comprises:

computer readable program code devices configured to cause a computer to effect an MD5 one-way hash.

15. A computer implemented method for encrypting data communications comprising the steps of:

providing for generating a salt at a data transmitting system;

providing for combining said salt with a primary encryption key known at said data transmitting system and a data receiving system;

providing for hashing said salt and said primary encryption key to produce a transmitting encryption key; and providing for encrypting a data message with an encryption function utilizing said transmitting encryption key to produce a ciphertext message.

16. The computer implemented method of claim 15 further comprising the step of:

providing for transmitting said salt and said ciphertext message to said data receiving system.

17. The computer implemented method of claim 16 further comprising the steps of:

providing for hashing said salt and said primary encryption key to produce a receiving decryption key; and providing for retrieving said data message by performing a decryption function on said ciphertext message and said receiving decryption key.

18. The computer implemented method of claim 15 wherein said step of providing for generating comprises the steps of:

providing for determining a system time; and providing for utilizing a number representing said system time as said salt.

19. The computer implemented method of claim 15 wherein said step of providing for hashing is carried out by means of an MD5 one-way hash.

20. A computer implemented method for encrypting data communications comprising the steps of:

generating a salt at a data transmitting system;

combining said salt with an encryption key known at said data transmitting system and a data receiving system; and hashing said salt and said encryption key to produce a transmitting encryption key that can be used to encrypt data messages prior to transmitting the data messages from the data transmitting system to the data receiving system.

\* \* \* \* \*